(No Model.)  5 Sheets—Sheet 1.

F. H. RICHARDS.
WEIGHING MACHINE.

No. 579,452.  Patented Mar. 23, 1897.

Witnesses:
C. W. Smith
Fred. J. Dole.

Inventor,
F. H. Richards.

(No Model.)

F. H. RICHARDS.
WEIGHING MACHINE.

No. 579,452. Patented Mar. 23, 1897.

5 Sheets—Sheet 3.

Witnesses:
O. W. Smith
Fred. J. Dole.

Inventor:
F. H. Richards.

(No Model.)  F. H. RICHARDS.  5 Sheets—Sheet 4.
WEIGHING MACHINE.

No. 579,452.  Patented Mar. 23, 1897.

Witnesses:
O. W. Smith
Fred. J. Dole.

Inventor
F. H. Richards.

(No Model.) 5 Sheets—Sheet 5.

F. H. RICHARDS.
WEIGHING MACHINE.

No. 579,452. Patented Mar. 23, 1897.

Witnesses:
O. W. Smith
Fred J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,452, dated March 23, 1897.

Application filed November 4, 1896. Serial No. 611,035. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various classes of granular materials, but more especially those of a lumpy nature, such as coal and crushed stone.

With respect to one of its features the invention comprehends the provision, in connection with weighing mechanism, of a rotary screen coöperative with the load-receiver of the weighing mechanism and operable for delivering separated and non-separated portions, respectively, of a supply of material to said load-receiver.

A further object of the invention is to provide simple and efficient means for thus separating the supply which includes a screen, which is preferably open-ended, and means for circumferentially supporting said screen for rotation, and the provision of mechanism for imparting a continuous rotative movement to said screen to thereby maintain an adequate supply of material to the load-receiver of the weighing mechanism.

Another object of the invention is to furnish means for successively stopping or interrupting the passage to the load-receiver of the streams composed, respectively, of the coarse and fine particles of material, a pair of stream-controllers or cut-off valves, operative with and controlled by the weighing mechanism, being preferably employed for this purpose.

Figure 1:
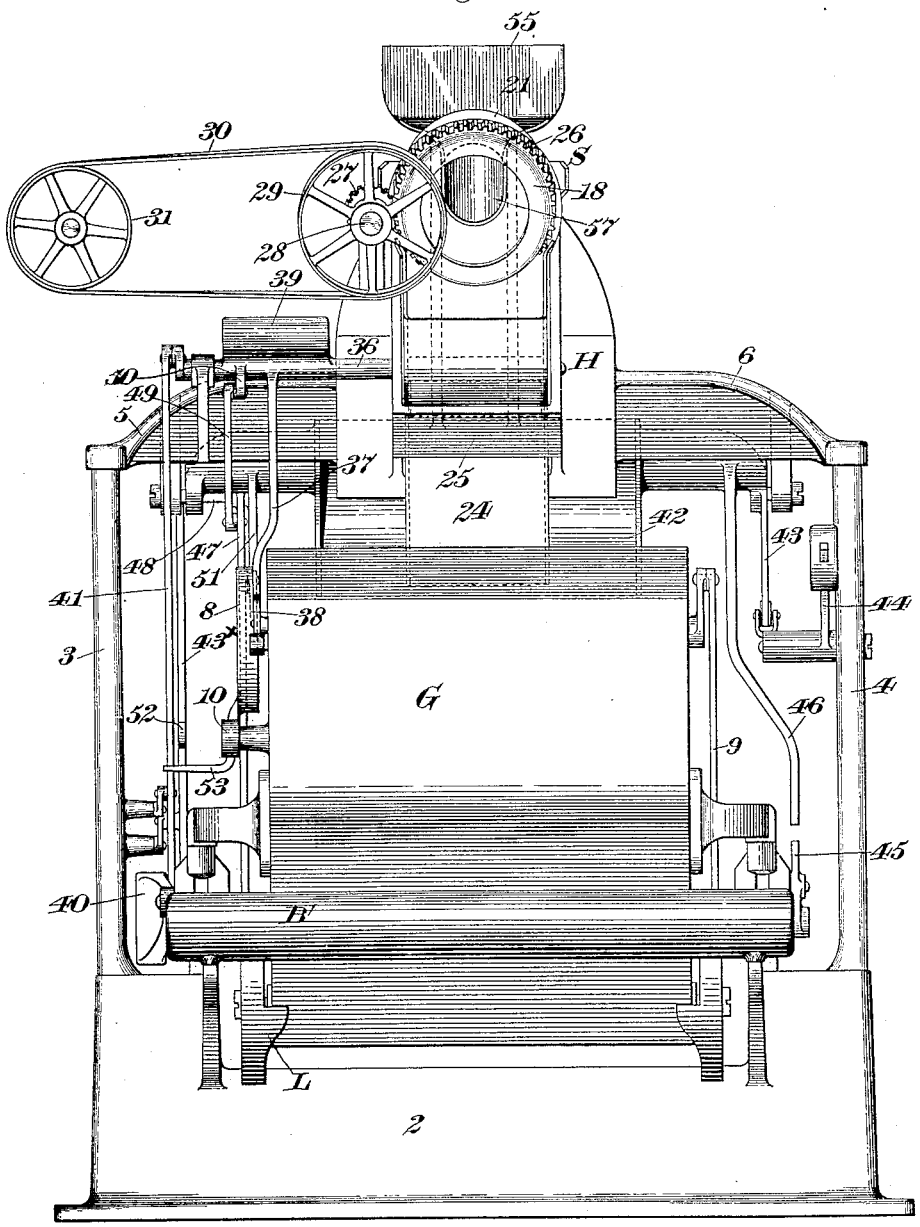
Figure 2:
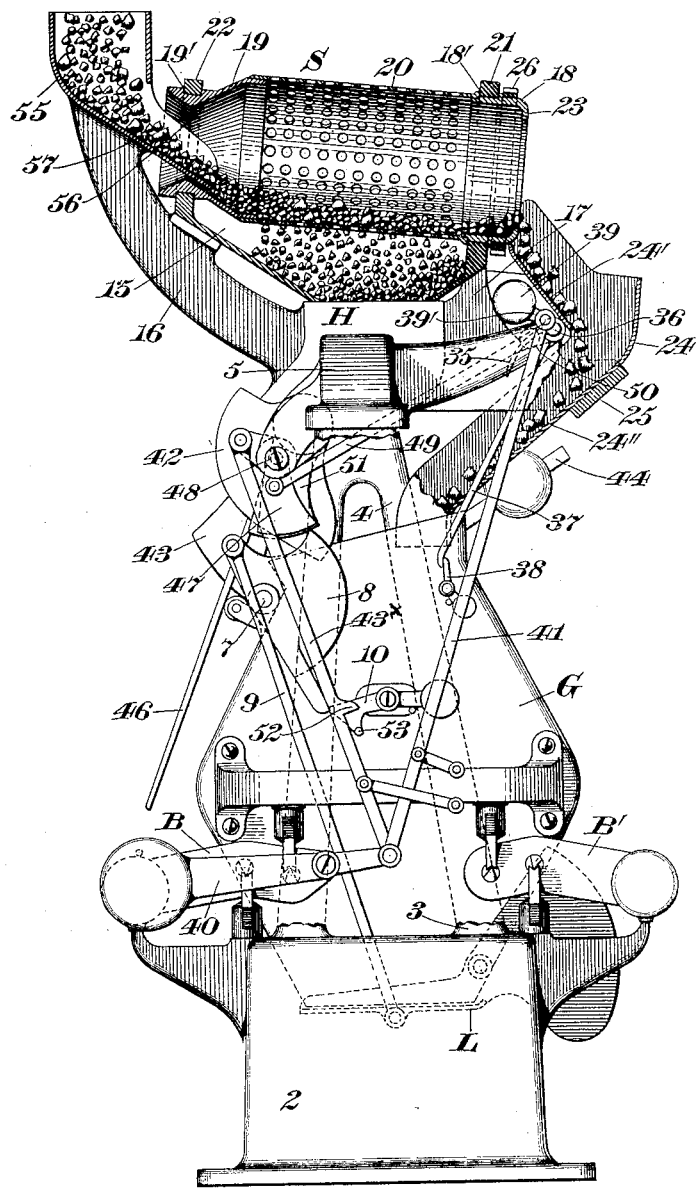
Figure 3:
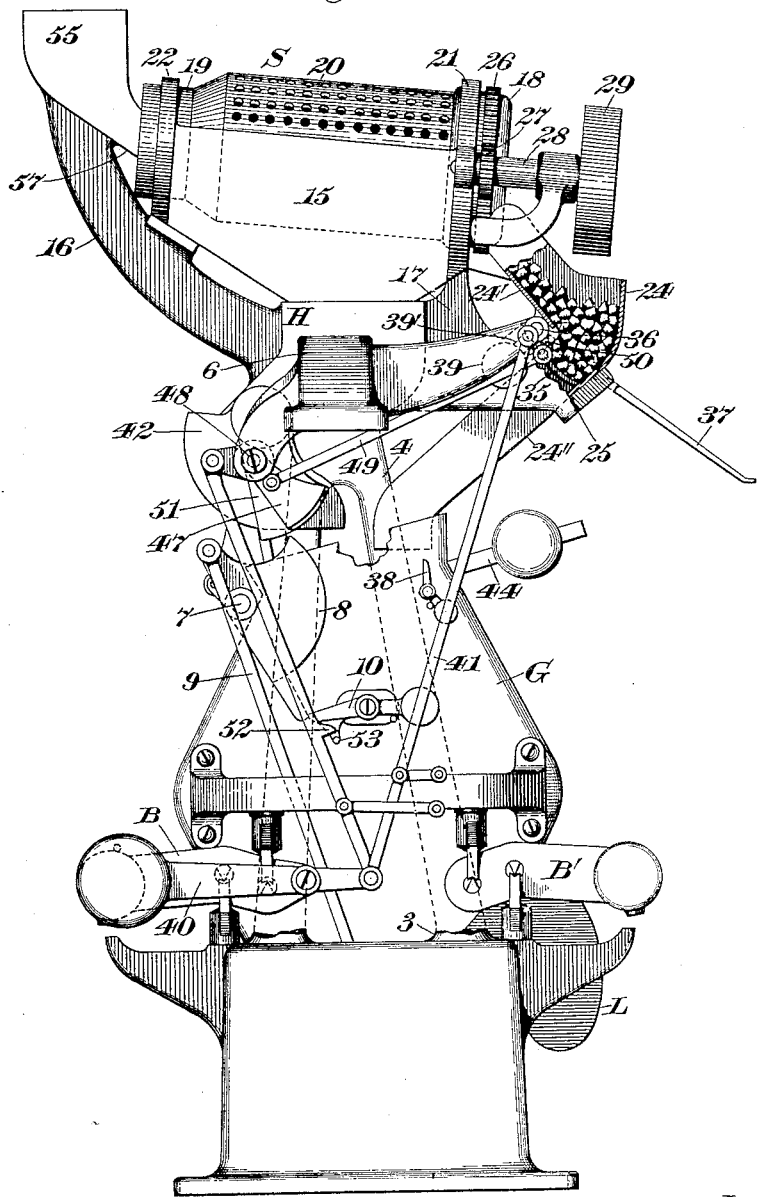
Figure 4:
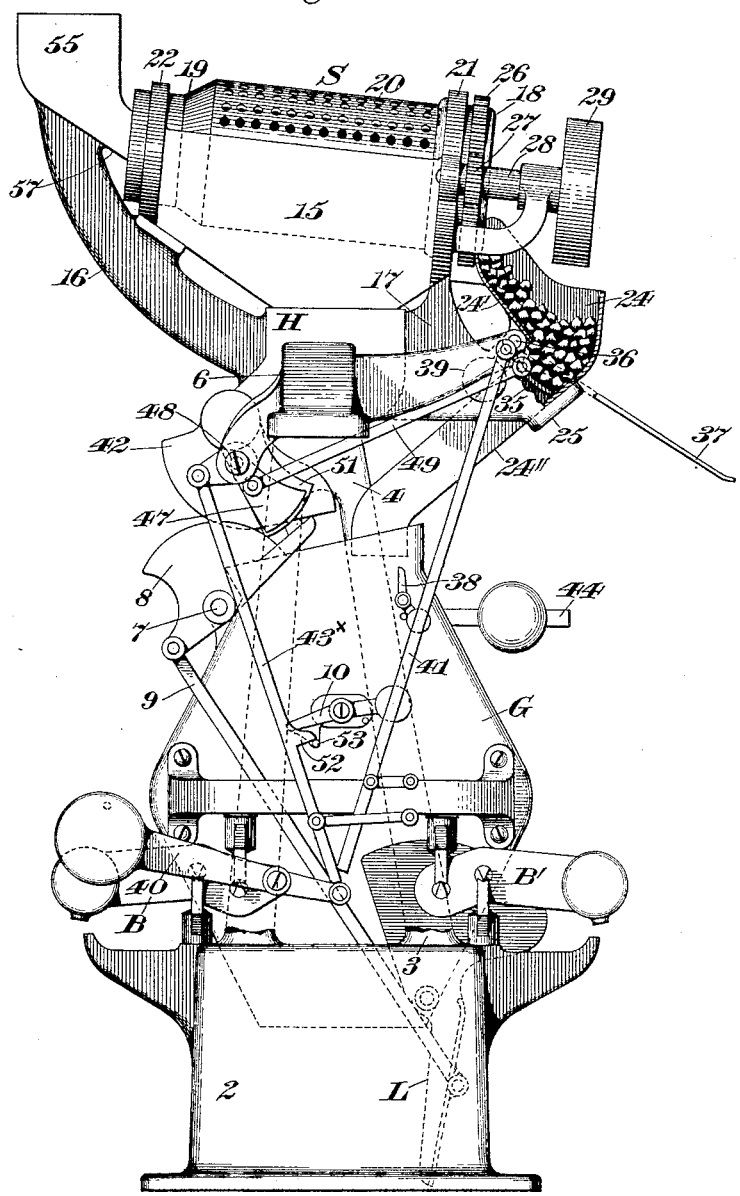
Figure 5:
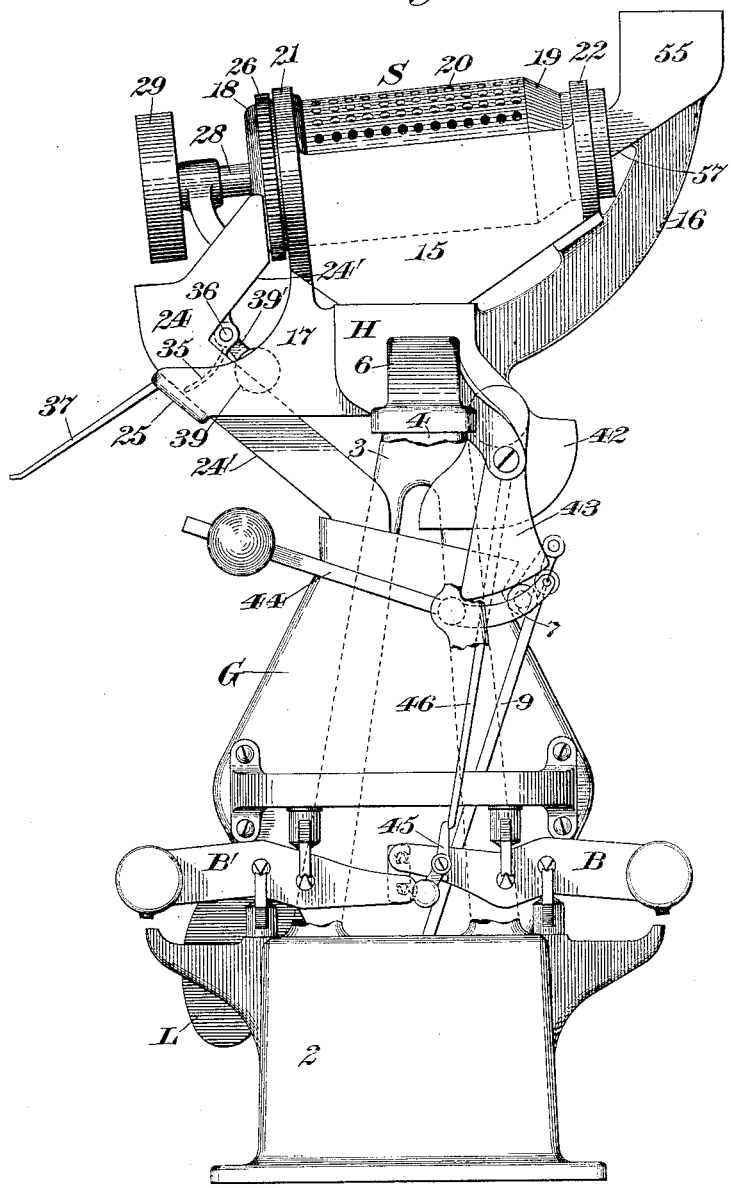

In the drawings accompanying and forming part of this specification, Figure 1 is a front elevation of a weighing-machine comprising my present improvements, and it illustrates the positions occupied by the respective working parts at the commencement of operation. Fig. 2 is an end elevation as seen from the left in Fig. 1, a portion of the supply apparatus being in central vertical section. Fig. 3 is a similar view, except that the supply apparatus is shown in full lines, the main supply to the load-receiver having been stopped by the closure of one of the valves, the other valve being in its drip position. Fig. 4 is a view like Fig. 3, the supply to the load-receiver or bucket having been completely stopped and the closer of said bucket being wide open to permit the same to discharge its contents; and Fig. 5 is an end elevation as seen from the right in Fig. 1 and with the parts in positions corresponding to Fig. 3.

Similar characters designate like parts in all the figures of the drawings.

The weighing mechanism is substantially similar in construction and mode of operation to that disclosed by Letters Patent No. 548,840, granted to me October 29, 1895, to which reference may be had, and it includes a load-receiver or bucket and supporting-beam mechanism to be hereinafter more particularly described.

The framework for carrying the various parts of the machine or apparatus may be of any suitable or preferred construction; and it consists in the present instance of the chambered base 2 and the end frames or columns 3 and 4 rising therefrom, to which latter are connected the brackets 5 and 6, forming a part of the framing, and which extend oppositely from the chute or hopper H.

The beam mechanism consists of the oppositely-disposed counterweighted scale-beams B and B', respectively, mounted upon the base 2 in the usual manner and provided with the ordinary supports for the bucket G, which is of the "single-chambered" type and which has the usual discharge-outlet.

The discharge-outlet for the bucket will be controlled by the closer L, which consists of an approximately flat plate pivotally connected to the bucket and contiguous to the lower edge thereof when in its normal or shut position, it being also counterweighted, the office of said counterweight or counterweights being to return the closer to its normal or shut position on the discharge of the bucket-load.

The means, which will now be briefly described, for holding the shiftable load-discharge member or bucket-closer against movement includes an inverted toggle and a detent device or latch for engaging one of the parts of said toggle. The bucket G carries in suitable bearings near the upper rearward side thereof the rock-shaft 7, to one end of which is affixed the rocker or segmental blade 8, which constitutes one member of the toggle, the other member being the rod 9, which is pivoted, respectively, to the rocker 8 and to the bucket-closer in such a manner that the several pivots thereof will be approximately in line when the closer is shut, so that said rocker, and consequently the closer, may be held against movement by a minimum pressure on the former.

The latch is designated by 10, it being pivotally supported on the bucket and also counterweighted, and in the form shown it swings upward to engage the coöperative arm 12 of the rocker, as illustrated in Fig. 3.

In weighing substances of a lumpy character—such as coal and crushed stone—with the ordinary types of weighing-machines the material, near the close of the weighing operation, due to the irregularity of its lumps, is liable to so clog and choke in the supply-chute as to seriously interfere with the final closing movement of the valve, which is generally a rapid one, thereby preventing the cut-off or stoppage of the supply to the load receiver or bucket with that promptness and facility which is essential to procure a precise definite load. To remove this disadvantage and for the purpose of insuring accuracy in this class of work, I provide a screen or riddle, which is located between the source of supply and the weighing mechanism and which is operable for delivering the separated or smaller lumps and the non-separated or larger lumps of the supply of material to said bucket in separated lots or streams, and I prefer to impart a continuous rotative movement to said screen to thereby maintain a constant supply of the material to said bucket.

During the major period of operation of the machine both the coarse and the fine particles of material will be concurrently conducted to the load-receiver. At a predetermined point, however, I stop the passage of the larger lumps to the load-receiver, but continue to supply the finer particles thereto, which are practically of a uniform size, so that the stream composed of the same may be readily controlled and promptly cut off at the proper stage.

The screen or riddle, which is designated by S, is open-ended, it being also inclined to promote the passage of the supply therethrough, it being also located over and slightly within the hopper or trough 15, in which the finer particles are sifted on the rotation of said screen.

The hopper or trough 15 is fixed at its front and rear ends to the brackets 16 and 17, respectively, which may be cast integral with the chute H, said hopper or trough 15 preferably leading into the chute H, which forms a depository for the separated or sifted mass and which is to be delivered thereby to the bucket G in the form of a stream of substantially uniform volume on the opening of a valve for said chute.

The screen S (see Fig. 2) consists of two end members or shells 18 and 19, joined by the reticulated or perforated section or cylinder 20, which embraces said end members and which is connected thereto in some convenient manner. The two end members 18 and 19 will be furnished with peripheral channels or bearings 18' and 19', respectively, in which the screen-supporting rings 21 and 22 lie, said rings or bands being preferably formed integral with the trough or hopper 15, and they constitute a means for limiting or preventing endwise or longitudinal movement of the screen S.

An annular flange is shown at 23, it being formed on the screen member 18, adjacent to its outlet, said flange serving to check the momentum of the moving body of material prior to its entrance into a conduit or spout which conducts the coarse lumps into the bucket G and to also prevent escape of the material which occasionally accumulates at this point.

The conduit for conducting the coarse supply from the screen S to the bucket G is designated by 24, and it is suitably fixed to the transverse member of the yoke 25, which constitutes a part of the framing of the apparatus, the receiving end of said conduit or spout 24 being adjacent to the discharge-outlet of the screen S and the discharge end of said conduit being extended into the bucket for a short distance.

The conduit 24 has a floor composed of two right-angular plates 24' and 24", the first-mentioned of which receives the coarse material from the screen S and which delivers it to the companion plate 24", which directs it into the bucket G, said plates being disposed at a relatively great inclination to thereby conduct the material rapidly to the bucket G, and by reason of the disposition of the plate 24" relatively to its mate it serves as a brake to modify the force of impact of the coarse supply.

The screen member 18 will carry a gear 26, the latter in the present case being in the form of a toothed band, which may be driven tightly thereon and which meshes with the driving-pinion 27 on the shaft 28, said shaft being suitably supported and being furnished with a pulley 29, connected by the driving-belt 30 to the power-wheel 31 of a suitable motor or line-shaft. (Not shown.)

The mechanism just described constitutes a convenient means for imparting the necessary rotative movement to the screen S for separating the fine particles from the supply, although other instrumentalities may be employed for the purpose.

The two classes of material will be conducted simultaneously to the bucket up to a certain point, or until the commencement of the poising or drip-supply period, at which time the passage of the coarse lumps thereto will be stopped, the delivery of the finer particles being subsequently arrested, and for successively cutting off the two streams I employ a pair of independently-operative and successively-closable valves, which are controlled or governed by the weighing mechanism, so that the shutting of said valves may be properly regulated to permit the requisite quantities to enter the bucket.

The valve for the coarse supply is designated by 35, it consisting of a slightly-curved plate carried by the shaft 36, which is supported by the framing of the machine, said valve being located near the discharge edge of the chute-plate 24' and having an oscillatory movement within the conduit or spout 24 to alternately cut off the coarse supply from and to permit it to pass to the bucket. The valve 35 will be normally maintained in its wide-open position, as illustrated in Fig. 2, to permit the unobstructed passage of the coarse supply to the bucket, the shaft 36 being equipped with the depending rod 37, which is engaged by the stop 38 on the bucket G to hold said valve in such position. At the commencement of the poising period the bucket G will have descended sufficiently far to carry the stop 38 below the plane of oscillation of the rod 37, which action will release said rod, and consequently the valve 35, so that the latter may be shut. For thus shutting or closing the valve I may employ the relatively large weight 39, which is carried by a rearwardly-projecting arm 39' on the shaft 36, said weight exerting a relatively great amount of force to effect a rapid shutting of the valve 35, as indicated in Fig. 4, and the consequent stoppage of the coarse supply.

The stop 38 on the bucket is of the "bypass" kind, so as to permit the opening of the valve 35 without hindrance.

The beam B shiftably carries the counterweighted lever 40, which normally forms a part of the beam mechanism, as will hereinafter appear, said lever on one of its strokes being adapted to impart an upward thrust to the relatively long rod 41, which is jointed to a crank-arm on the valve-shaft 36, to thereby force the valve open.

The valve for controlling the stream which flows from the chute H, and which is to complete the partial load furnished jointly by said stream and the coarse supply, is designated by 42, it being oscillatory across the discharge-orifice of the chute and being pivotally supported between suitable arms on the brackets 5 and 6. For actuating said valve to close the same to first reduce and to subsequently cut off the stream which flows from the chute H, I employ mechanism substantially similar to that disclosed by Letters Patent No. 548,843, granted to me October 29, 1895, to which reference may be had, and which includes the cam 43, which is rigidly connected to said valve, and the counterweighted lever 44, which is pivotally supported by the framing of the machine, and which lever is furnished with an antifriction-roll adapted to ride in contact with the working face of said cam to thereby close the valve, said face being of such shape as to permit the application to the valve of different amounts of force, whereby it may be closed with great rapidity at the completion of a load.

The lever 40, to which I have previously referred, is pivoted near the inner end of one of the arms of the beam B, its weight, however, being normally added to the counterpoised side of said beam. On the descent of the bucket with the beam mechanism during the loading period said counterweighted lever will be carried down with the beam mechanism until the latter has reached the limit of its downstroke, at which time the weighted bucket-load is discharged. On the discharge of the load the valve 42 will be held against opening by interlocking stop mechanism to be hereinafter described, although the two beams are free to return to their normal positions, as indicated in Fig. 4; but the lever will be locked against return movement with the beam B by the rod $43^\times$, which bears against said lever and which is pivoted to the valve 42 at a point to the rear of its center of movement.

When the valve is released on the shutting of the bucket-closer, as will hereinafter appear, the lever 40 will be also released and can then resume its normal position, as shown in Fig. 2, and in so doing it will transmit an upward thrust to the rod $43^\times$, which is communicated to the valve 42 for forcing the same open.

At a predetermined point in the closure of the valve 42 it will be momentarily intercepted to permit the drip-stream to enter the bucket for the purpose of completing the load. As a means for thus temporarily holding said valve I provide the by-pass stop 45, which is carried by one of the arms of the beam B, and against which the free end of the relatively long rod 46, which is rigidly connected to said valve, is adapted to abut when the latter has nearly reached the end of its cut-off stroke, as indicated in Fig 5.

When the beam mechanism passes below the so-called "poising-line," indicating the completion of a bucket-load, the by-pass 45 will descend clear of the rod 46, thereby freeing the valve 42, so that it may be given its rapid and final closure for cutting off the last part of the supply, as indicated in Fig. 4. On the opening movement of the valve 42 the rod 46 will strike the by-pass 45 and swing the same ineffectively about its pivot.

In connection with the valve 35 and with the closer L, I employ reciprocally-effective stops, the rocker 8 constituting one of said stops, while the other is designated by 47, the first-mentioned stop being so operable as to prevent opening of the valve while the closer is open and any part of the load is being discharged, while the companion stop prevents the discharge of the load by blocking the opening of the closer should the latch 10 be tripped too quickly.

The stop 47 is shiftable about an axis in common with that of the valve, it being loose on the short shaft 48, which is mounted on said valve, and is connected by the rod 49 to the crank-arm 50 on the valve-shaft 36. The two stops 47 and 51 are of segmental shape, the curved faces thereof being concentric with the respective axes of movement of said member. The action of the two interlocking stops will be evident from an inspection of Figs. 2, 3, 4, and 5.

Attention is called to Fig. 2, wherein the valve 35 is illustrated as being in its wide-open position, the rocker 8 being substantially in contact with the stop 47, so that should the latch 10 be prematurely tripped the rocker or stop 8 might oscillate for a very limited distance or until it meets the blade or stop 47, which would arrest its further progress, thereby holding the closer against the bucket and shut.

When the valve 35 is closed in the manner hereinbefore specified, the rod 49 will be drawn rapidly to the right, as indicated in Fig. 3, thereby throwing the stop 47 bodily across the plane of oscillation of the stop 8, so that the latter is free to swing about its axis so far as the stop 47 is concerned. To prevent this action, however, I provide a second closer limiting or retarding stop 51, which is similar in shape to the member 47 except that its curved face is much longer.

The stop 51 is rigidly attached to the valve 42, and not until said valve is fully closed will the same release the rocker 8. When said valve 42 has cut off the supply-stream, the blade or stop 51 will have been caused thereby to cross the plane of the curved face of the stop 8, so that, the latch being tripped, the closer L can be forced open, and in so doing it will swing the rocker 8 about its axis and the curved face thereof will bear against the two stops 47 and 51, as illustrated in Fig. 4, whereby retractive movement of said stops 47 and 51 will be positively prevented, the two valves being thereby held in their closed positions. When the closer is shut, the rocker 8 will be returned to its normal position, as indicated in Figs. 2 and 3, thereby releasing the two stops 47 and 51, and, necessarily, the two valves, so that the latter may be opened through the intervention of the shiftable counterweighted lever 40 in the manner herein set forth.

For tripping the latch 10 to effect the discharge of the bucket-load I provide the latch-tripper 52, which consists of a fixed projection on the reciprocatory thrust-rod $43^\times$ and which is adapted to impinge against the pin 53 on the latch 10 at a point very near the end of the cut-off stroke of the valve 42 and on the rapid downstroke of said rod, so that said latch will be tripped and the closer L freed of all restraint, whereby it can then be forced open by the weight of the contents within the bucket G.

For delivering the material to the rotary screen S, I provide the spout 55, which receives the same from a suitable source of supply (not shown) and which is mounted on the bracket 16, said spout projecting through the inlet-opening of the screen S, as indicated more clearly in Fig. 2. The throat of the screen is reduced or contracted somewhat, as at 56, the floor 57 of the spout 55 being inclined and substantially parallel with the mass-carrying portion of the throat to thereby permit the gravitating material to freely enter the reticulated section of the screen.

The operation of the hereinbefore-described machine, briefly, is as follows: Fig. 2 represents the positions of the various parts at the commencement of operation, the valves 35 and 42 being wide open and the former being held in such position by the stop 38, which is in contact with the valve-rod 37, the closer L being locked in its shut position by the latch 10, which is in engagement with the arm 12 of the rocker 8. The spout 55 delivering material to the rotary screen S, the screen will sift the finer particles therefrom, which drop into the hopper 15, thence pass into the chute II, thence to the valve 42, and from thence into the empty bucket G, while the coarse lumps pass entirely through the screen and enter the spout 24, which directs them into the bucket. When a certain proportion of the predetermined load has been received by the bucket G, it will descend with the beam mechanism, and the counterweighted lever 40, moving with the latter and away from the rod $43^\times$, will permit the slow closure of the valve 42 by the counterweighted lever 44, and at about the time said valve reaches the position shown in Figs. 3 and 5 the by-pass stop 38 will release the rod 37 and the valve 35, whereby said valve will be promptly shut by the weight 39. At this time, however, the complete closure of the valve 42 will be prevented by the stop 45 on the beam B, which engages the rod 46 of the valve 42. When the beam mechanism passes below the poising-line, the stop 45 will pass out of contact with the rod 46, so that the valve 42 will have imparted thereto its accelerated final movement by the lever 44 to cut off the last part of the stream from the chute, as illustrated in Fig. 4. On such final movement of the valve the rod $43^\times$ will be forced downward with the projection 52 thereon against the pin 53 on the latch 10, thereby depressing said latch sufficiently far to disconnect it from the rocker 8, whereby the closer L, being then freed of all restraint, can be forced open by the weight of the material or load within the bucket, as shown in Fig. 4, and when the load is discharged the several parts of the weighing mechanism will resume their normal positions, as represented in Fig. 2.

Having described my invention, I claim—

1. The combination, with weighing mechanism including a load-receiver having a closer, of a screen operable for separating the fine particles of the supply of material therefrom; means for conducting such fine particles to the load-receiver; a spout having its receiving end supported adjacent to the discharge-outlet of said screen and adapted to receive the coarse portion of the supply and to conduct it to the load-receiver, said spout consisting of two angularly-disposed inclined plates; a valve supported adjacent to the discharge edge of one of said plates for controlling the delivery of the coarse portion of the supply to the load-receiver; a shaft carrying said valve and having a crank-arm; a second valve for controlling the delivery of the fine portion of the supply to the load-receiver; a pair of stops, one of which is affixed to the last-mentioned valve and the other of which is movable about an axis in common therewith; a stop connected with the closer and coöperative with said pair of stops; a rod connected, respectively, with said movable stop and the crank-arm; a valve-actuating weight affixed to said shaft; and connections between the two valves and the weighing mechanism.

2. The combination, with weighing mechanism including a load-receiver, of a chute carried by the framework; a hopper located over said chute; a screen rotatably supported by said hopper, said screen being adapted to separate the fine particles of a supply of material therefrom, which drop into said hopper and from thence into the chute; a spout having its receiving end supported adjacent to the delivery end of said screen for conducting the coarse portion of the supply to the load-receiver, said spout consisting of two angularly-disposed plates one of which is sustained by a yoke on the framework; a valve supported adjacent to the discharge edge of one of said plates; a valve movable below said chute; and valve-actuating means controlled by the weighing mechanism.

3. The combination with a bucket having a shiftable load-discharge member, of means for supplying two independent streams of material to said bucket; a pair of independently-supported valves operable, respectively, for controlling said streams; stops movable about an axis in common, one of said stops being rigid with one of the valves, the other stop being operatively connected to the other valve; and a third stop coactive with said first-mentioned stops and operatively connected with the closer.

4. The combination with a bucket having a closer, and with means for supplying independent streams of material thereto; of a pair of valves, one of which is mounted on a shaft and the other of which carries a pair of stops one of which is loose relatively thereto; and an operative connection between said loose stop and said valve-shaft; and a stop operable with the closer and coactive with said first-mentioned stops.

5. The combination with a bucket having a closer, and with means for supplying independent streams of material thereto; of a pair of valves one of which is mounted on a supporting-shaft and the other of which carries a pair of stops one of said stops being loose on a shaft; and an operative connection between said loose stop and the supporting-shaft.

FRANCIS H. RICHARDS.

Witnesses:
    FRED. J. DOLE,
    HEATH SUTHERLAND.